United States Patent
Higgins

(10) Patent No.: US 8,326,556 B2
(45) Date of Patent: Dec. 4, 2012

(54) STRAY FLUX PROCESSING METHOD AND SYSTEM

(75) Inventor: Simon Higgins, Johannesburg (ZA)

(73) Assignee: Eskom Holdings (Pty) Limited, Sandton (ZA)

( * ) Notice: Subject to any disclaimer, the term of this patent is extended or adjusted under 35 U.S.C. 154(b) by 732 days.

(21) Appl. No.: 12/510,655

(22) Filed: Jul. 28, 2009

(65) Prior Publication Data

US 2010/0030502 A1     Feb. 4, 2010

(30) Foreign Application Priority Data

Jul. 29, 2008   (ZA) .................................. 2008/06603

(51) Int. Cl.
*G01R 13/00*   (2006.01)

(52) U.S. Cl. ......................................................... 702/66

(58) Field of Classification Search .................... 702/66, 702/67, 68, 70, 71, 73, 90, 183, 185, 188; 324/149, 223, 244, 257, 260, 301, 510, 546
See application file for complete search history.

(56) References Cited

U.S. PATENT DOCUMENTS

| | | | | |
|---|---|---|---|---|
| 6,064,172 A | * | 5/2000 | Kuznetsov | 318/716 |
| 2004/0189279 A1 | * | 9/2004 | Rao et al. | 324/149 |

OTHER PUBLICATIONS

H. Henao, G.A. Capolino et al,. On the Stray Flux Analysis for the detection of the Trhee-Phase Induction Machine Faults, 2003, IEEE, pp. 1368-1373.*

\* cited by examiner

*Primary Examiner* — Mohamed Charioui

(74) *Attorney, Agent, or Firm* — Nelson Mullins Riley & Scarborough LLP; Anthony A. Laurentano

(57) ABSTRACT

A method of and system for processing stray flux data associated with a synchronous electrical machine; the method comprising capturing stray flux data from the synchronous electrical machine; generating a stray flux waveform using at least the captured stray flux data; analysing the generated stray flux waveform and the captured stray flux data; and storing the generated stray flux waveform and the captured stray flux data in a database.

17 Claims, 17 Drawing Sheets

40

```
     START
       │
       ▼
┌─────────────────┐
│ DETERMINING ZERO│
│STRAY-FLUX CROSSING│
│       41        │
└─────────────────┘
       │
       ▼
┌─────────────────┐
│ DETERMINING MW MVA│
│ OPERATING POINT FOR│
│ THAT MEASURED STRAY│
│  FLUX WAVEFORM  │
│       42        │
└─────────────────┘
       │
       ▼
┌─────────────────┐
│ PLOTTING POINT ON│
│ CAPABILITY CHART│
│       43        │
└─────────────────┘
       │
       ▼
      END
```

*Fig. 3a*

STRAY FLUX PROCESSING METHOD AND SYSTEM

BACKGROUND OF THE INVENTION

THIS invention relates to a stray flux processing method and also to a system therefor.

Synchronous electrical machines such as electric motors, generators, or the like generally include at least a coil wound rotor in their construction. During the operation of these synchronous electrical machines, stray flux is often resultantly generated.

It is an object of the present invention at least to be able conveniently to process stray flux data indicative of the stray flux generated by the machine.

SUMMARY OF THE INVENTION

According to a first aspect of the invention there is provided a method of processing stray flux data associated with a synchronous electrical machine; the method comprising:
  capturing stray flux data from the synchronous electrical machine;
  generating a stray flux waveform using at least the captured stray flux data;
  analysing the generated stray flux waveform and the captured stray flux data; and
  storing the generated stray flux waveform and the captured stray flux data in a database.

The step of analysing the generated stray flux waveform may comprise:
  determining a capability chart associated with the synchronous electrical machine;
  determining rotor zero flux crossings from at least the stray flux waveform, the rotor zero flux crossings being those points at which flux sensitivity is at a maximum level;
  applying the rotor zero flux crossings to the capability chart; and
  plotting the rotor zero flux crossings on the capability chart.

The step of determining the capability chart may comprise:
  determining zero stray flux crossings on run up or run down of the synchronous electrical machine;
  capturing data indicative of real and reactive power of the synchronous electrical machine for each determined zero stray flux crossing; and
  generating the capability chart using at least the captured data indicative of the real and reactive powers and the determined zero stray flux crossings.

The method may further comprise:
  determining zero stray flux crossings for the generated stray flux waveform;
  determining a MW MVA operating point for the generated stray flux waveform; and
  plotting the determined operating point on the capability chart.

The method may further comprise automatically generating rotor slot lines on the capability chart.

The method may further comprise:
  determining when the captured stray flux data or the generated stray flux waveform is at a zero stray flux crossing that corresponds to a particular rotor slot;
  determining a MW MVA operating point for the generated stray flux waveform associated with the determined zero stray flux crossing that corresponds to the particular rotor slot;
  plotting the determined MW MVA operating point on the capability chart; and
  plotting a line on the capability chart from a rotor slot zero stray flux crossing line origin through the plotted determined MW MVA operating point associated with the determined zero stray flux crossing that corresponds to that particular rotor slot.

The method may also comprise determining the rotor zero stray flux crossings from machine design data and/or from the captured stray flux data.

The method may further comprise trending any change in stray flux associated with the machine between data captures by using at least the stray flux data stored in the database.

The method may comprise the steps of:
  capturing stray flux data automatically each time an airgap flux zero of the machine passes through a slot;
  capturing stray flux data manually as desired; and
  capturing stray flux data at predetermined intervals.

The method may comprise the steps of:
  determining rotor slot information, the rotor slot information being indicative of leading and lagging rotor slots; and
  determining if symmetrical inter-turn faults are present in a rotor of the machine from the rotor slot information.

According to a second aspect of the invention there is provided a system for processing stray flux associated with a synchronous electrical machine; the system comprising:
  a data capture module arranged to interface with the machine by way of radial and/or tangential flux probes to capture stray flux data therefrom;
  a data analysis module operable to use the stray flux data captured by the data capture module at least to:
    generate a stray flux waveform; and
    analyse the stray flux waveform and the captured stray flux data;
  and
  a database operable to store at least the generated stray flux waveforms and the captured stray flux data.

The system may comprise a user interface, the user interface being arranged at least to display the generated stray flux waveforms and data determined by the data analysis module.

The data analysis module may be arranged at least to generate tables, lists or similar information from the captured stray flux data.

The data analysis module may also be arranged to:
  determine a capability chart associated with the synchronous electrical machine;
  determine rotor zero flux crossings from at least the stray flux waveform, the rotor zero flux crossings being those points at which flux sensitivity is at a maximum level;
  apply the rotor zero flux crossings to the capability chart; and
  plot the rotor zero flux crossings on the capability chart.

The data analysis module may be arranged to:
  determine zero stray flux crossings for the generated stray flux waveform;
  determine a MW MVA operating point for the generated stray flux waveform; and
  plot the determined operating point on the capability chart.

The data analysis module may be arranged to detect rotor slot lines on the capability chart by:
  determining when the captured stray flux data or the generated stray flux waveform is at a zero stray flux crossing that corresponds to a particular rotor slot;

determining a MW MVA operating point for the generated stray flux waveform associated with the determined zero stray flux crossing that corresponds to the particular rotor slot;

plotting the determined MW MVA operating point on the capability chart; and plotting a line on the capability chart from a rotor slot zero stray flux crossing line origin through the plotted determined MW MVA operating point associated with the determined zero stray flux crossing that corresponds to that particular rotor slot.

The data analysis module may be arranged to trend any change in stray flux associated with the machine between data captures by using at least the stray flux data stored in the database.

The data analysis module may be arranged to determine a number of shorted turns in a leading and lagging coil respectively in a particular pole coil pair associated with the machine.

The data analysis module may also be arranged to:

determine rotor slot information, the rotor slot information being indicative of leading and lagging rotor slots; and determine if symmetrical inter-turn faults are present in a rotor of the machine from the rotor slot information.

The data analysis module may be arranged to use stray flux data stored in the database to trend any change in stray flux between data captures.

BRIEF DESCRIPTION OF THE DRAWINGS

FIG. 3a shows a flow diagram of another method in accordance with an example embodiment of placing a stray flux reading on a capability chart;

DESCRIPTION OF PREFERRED EMBODIMENTS

In the following description, for purposes of explanation, numerous specific details are set forth in order to provide a thorough understanding of an embodiment of the present disclosure. It will be evident, however, to one skilled in the art that the present disclosure may be practiced without these specific details.

Figure 1:
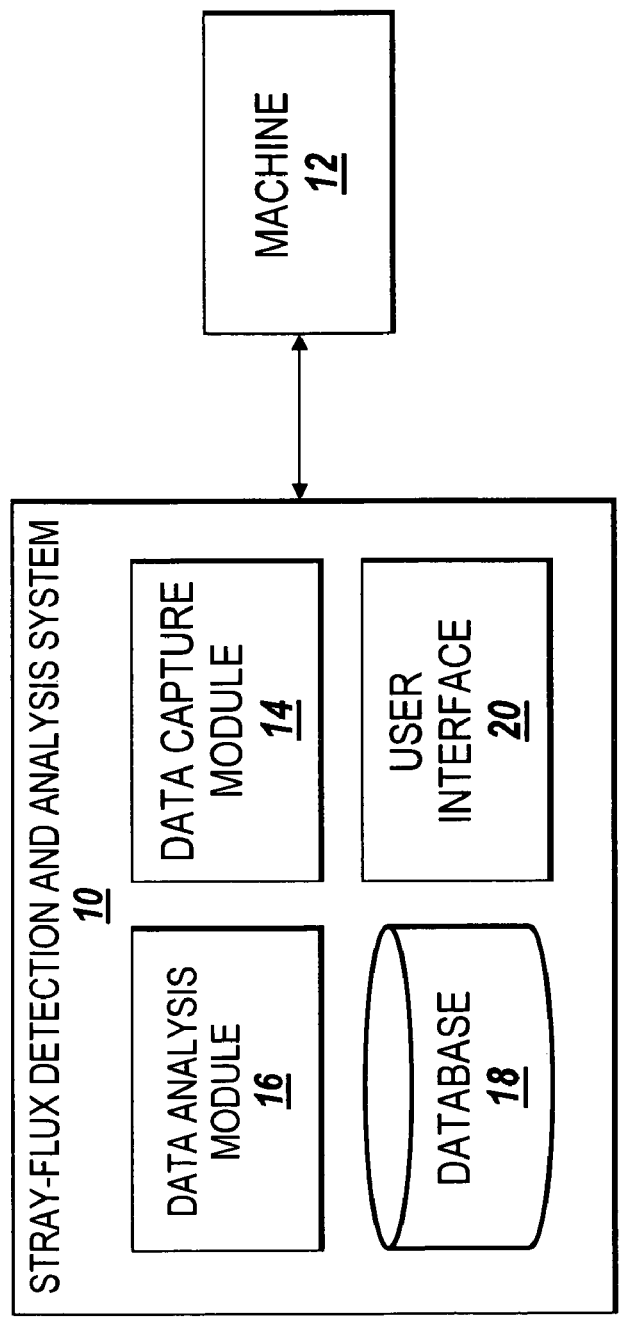
FIG. 1 shows a schematic diagram of a system in accordance with an example embodiment, the system interfacing with an synchronous electrical machines.

Referring to FIG. 1 of the drawings where an example embodiment of a system for processing stray flux data associated with a synchronous electrical machine is generally indicated by reference numeral 10. The system 10 is shown interfaced with a synchronous electrical machine 12 in order to process stray flux from the machine 12. Typically, the machine 12 is an electrical motor, generator, or any machine prone to generate stray flux during its operation. In this particular example embodiment, the machine 12 includes at least a wound coil rotor arrangement. It will be appreciated that processing the stray flux data includes detecting and analysing the stray flux data. In other words, the processing of the stray flux data would allow a user of the system 10 to easily and conveniently detect and analyse the stray flux associated with the machine 12.

The system 10 comprises a plurality of components or modules which correspond to the functional tasks to be performed by the system 10. In this regard, "module" in the context of the specification will be understood to include an identifiable portion of code, computational or executable instructions, data, or computational object to achieve a particular function, operation, processing, or procedure. It follows that a module need not be implemented solely in software; a module may be implemented in software, hardware, or a combination of software and hardware. Further, the modules need not necessarily be consolidated into one device but may be spread across a plurality of devices to obtain desired functionality of the system 10.

In particular, the system 10 includes a data capture module 14 arranged to interface with the machine 12 to capture stray flux data therefrom, typically by way of radial and/or tangential flux probes via an A/D (Analogue to Digital) card. The stray flux data captured is typically in the form of a stray flux signal from the probe/s.

The system 10 includes a data analysis module 16 operable to use the stray flux data captured by the data capture module 14 at least to generate stray flux waveforms. The module 16 is advantageously arranged to analyse the generated stray flux waveform and the captured stray flux data.

The stray flux waveforms are conveniently displayed in the form of graphs as will be described in greater detail below. The data analysis module 16 is also arranged to generate tables, lists or the like of information from the captured stray flux data as will be described in greater detail below.

The system also includes database 18 operable to store at least captured stray flux data including the graphs generated by the data analysis module 16 for example the generated stray flux waveforms.

In a preferred embodiment, the system 10 includes a user interface 20, the user interface 20 being operable to display the generated stray flux waveforms to a user of the system 10. It follows that the user may also view any stray flux data, which includes the stray flux waveforms, stored in the database 18. The user interface 20 is typically a computer with a front-end graphical user interface (GUI) with which the user can use to interact with the system 10.

In an example embodiment, the user interface 20 is arranged to receive information from the user regarding the machine 12 and/or other information required by the system 10 for the processing of the stray flux data. For example the user interface 20 may be arranged to receive information indicative of the types of flux probes used for example radial and/or tangential flux probes, the machine 12 type for example whether the machine 12 is a two or four pole synchronous machine 12, number of rotor slots, configuration of the number of turns in each rotor coil of the machine 12, or the like. The system 10 advantageously configures itself to operate based on the parameters received by way of the user interface 20, the parameters being the details of the machine 12.

It will be appreciated that the data analysis module 16 analyses the stray flux by determining the points at which flux sensitivity is at a maximum level or at its greatest; and conveniently displays, shows or illustrates the points at which flux sensitivity is at its greatest on the capability chart of the machine 12 (discussed in greater detail below). This may include applying the rotor zero flux crossings to the capability chart and plotting the zero flux crossings on the capability chart.

To allow the machine to be operated in such a way as to allow a manual reading to be taken at the appropriate zero stray flux crossing the module 16 is arranged to determine the rotor slot crossings. It will be noted that the rotor slot crossing are the rotor zero flux crossings. In one example embodiment, the rotor zero flux crossings may be understood to include the zero stray flux crossings. The data analysis module 16 determines the rotor slot crossings from the machine 12 design data. Instead, or in addition, the data analysis module 16 determines the rotor slot crossings from test data. The test data is typically the stray flux data stored in the database 18, or in other words the stray flux data captured by the data capture module 14.

The data analysis module 16 is also arranged to use stray flux data stored in the database 18 to trend any change in stray flux between data captures. In an example embodiment, the system 10 is arranged to display a stray flux trend of the machine 12 against a calendar. This is useful as it advantageously allows the user, via the user interface 20, to view stray flux trends associated with the machine 12 during operation thereof over a desired period of time.

It must be noted that the database 18 is advantageously arranged to store a plurality of stray flux waveforms as applied to the capability chart of the machine 12. In an example embodiment, all data stored in the database 18 may be printable by a user.

Stray flux data is typically captured as part of a testing procedure of the machine 12. The testing procedure is preferably carried out by the system 10 to test the machine 12 for stray flux emitted thereby. In this regard, the processing may be or may form part of stray flux testing of the machine 12. Testing, or stray flux data capture, is advantageously initiated automatically by the data capture module 14 each time an airgap flux zero of the machine 12 passes through a slot. This type of automatic testing is referred to as on-line testing.

As an aside, it will be noted that under maximum load conditions the zero flux crossing is centered around only one slot of the machine 12. For the zero flux crossing to pass through more than one slot, the operating point of the machine 12 has to be altered. By doing this, the machine 12 can be operated in such a way that zero stray flux crossing can pass through two or three slots.

The data capture module 14 is typically arranged to determine when the airgap flux zero of the machine 12 passes through a slot by comparing the generated stray flux waveform with a known reference stray flux reading. The known stray flux reading may typically be the captured stray flux data. In particular, the data capture module 14 compares a point of zero stray flux crossing with peaks of the generated stray flux waveform. However, this can only be done directly on machines 12 that have radial flux probes fitted. For machines 12 that have a tangential probe fitted a mathematical transform that alters the phase position of the signal by 90 degrees is applied. Following this transform the tangential probe signals are processed using the same algorithms as the radial probe signal. It follows that when the zero stray flux crossing corresponds with a peak produced by a particular slot, tables are generated for each slot by the data analysis module 16. One of the tables generated indicate peak values for the leading and lagging slots in each pole pair. For example, for a machine 12 with two poles A and B, the following table is generated:

TABLE 1

Peak values for leading and lagging slots for a two-pole machine

|  | Slot | A pole peak value | B pole peak value | Ratio pole A/B | % Shorted turns A/B |
|---|---|---|---|---|---|
| Leading | 1 |  |  |  |  |
|  | 2 |  |  |  |  |
|  | . |  |  |  |  |
|  | . |  |  |  |  |
|  | . |  |  |  |  |
|  | N |  |  |  |  |
| Lagging | 1 |  |  |  |  |
|  | 2 |  |  |  |  |
|  | . |  |  |  |  |
|  | . |  |  |  |  |
|  | . |  |  |  |  |
|  | N |  |  |  |  |

In Table 1 above, the last two columns indicate the ratio of the A pole and B pole peak values and the number of detected shorted turns for the leading and lagging slots for poles A and B respectively.

It follows that for a four pole machine 12 with poles A, B, C and D, the table generated by the data analysis module 16 is similar to Table 1 with further columns, particularly the columns of the table generated for a four pole machine 12 will include A pole peak values, B pole peak values, C pole peak values, D pole peak values, the ratio of the peak values from any pole with the peak value from any other pole, the number of detected shorted turns when comparing the leading and lagging slots for any pole with any other pole.

Another table which is generated by the data analysis module 16 is for the average of the absolute value of the valley-to-peak value of the leading and lagging slots for each pole pair. For example, for a two pole machine 12 with poles A and B, the following table is generated:

TABLE 2

Average of the absolute value of the valley-to-peak
value of leading and lagging slots for each pole pair

| Slot | A pole average value | B pole average value | Ratio pole A/B average value | % Shorted turns A/B |
|---|---|---|---|---|
| 1 | | | | |
| 2 | | | | |
| . | | | | |
| . | | | | |
| . | | | | |
| n | | | | |

It will be appreciated that the last two columns of Table 2 indicate the ratio of the A pole and B pole average values and number of detected shorted turns for poles A and B respectively.

It follows that for a four pole machine with poles A, B, C, and D, the table generated by the data analysis module 16 is similar to Table 2 with further columns, particularly the columns of the table generated for a four pole machine will include A pole average values, B pole average values, C pole average values, D pole average values, the ratio of the average values from any pole with the average value from any other pole, the number of detected shorted turns when comparing slots for any pole with any other pole.

Yet another table is generated by the data analysis module 16 of averages of the absolute values of the valley-to-peak values of opposing pole coil pairs leading and lagging slots. For a two pole machine 12, a table as shown below is typically generated:

TABLE 3

Averages of the absolute values of the valley-to-peak values
of opposing pole coil pairs leading and lagging slots

| Slot | A/B pole average value | B/A pole average value | Ratio pole A/B to pole B/A average value | % Shorted turns pole A/B to pole B/A |
|---|---|---|---|---|
| 1 | | | | |
| 2 | | | | |
| . | | | | |
| . | | | | |
| . | | | | |
| n | | | | |

The last two columns of Table 3 indicate the ratio of the A/B pole and B/A pole average values, and the number of detected shorted turns for the A/B and B/A poles.

It will be noted also that for a four pole machine 12 with poles A, B, C, and D, the table generated by the data analysis module 16 is similar to Table 2 with further columns, particularly the columns of the table generated for a four pole machine 12 will include A/B pole average values, B/A pole average values, C/D pole average values, D/C pole average values, ratio of the A/B pole and B/A pole average values, ratio of the C/D pole and D/C pole average values, number of detected shorted turns for the A/B and B/A poles, and number of detected shorted turns for the C/D and D/C poles.

The tables shown above are typically generated to be stored in an open type format for easy access to systems using OPC (Object Linking and Embedding (OLE) for Process Control) or SQL (Structured Query Language), or similar formats.

In other example embodiments, the data capture module 14 is arranged to determine when the airgap flux zero of the machine passes through a slot by identifying zero stray flux crossings on the capability chart of the machine 12. In an example embodiment, the zero stray flux crossings are advantageously plotted on the capability chart.

It will be noted that the data analysis module 16 is arranged to generate the capability chart referred to above. In order to generate the capability chart, the data analysis module 16 is arranged to monitor the zero crossing points on run up (or run down) of the machine 12, and also arranged to note the real and reactive power for each point. The module 16 is arranged to generate the capability chart using at least data indicative of the real and reactive powers and the determined zero stray flux crossings. It will be noted that data indicative of the real and reactive powers are advantageously captured. It will be understood that each of these points is then extended through a rotor slot zero stray flux crossing line origin (MVA/Xq) or the stability limit point thereby producing a family of curves, typically zero stray flux crossing curves. These curves are a representation of the loading required to run the machine 12 at any of the zero stray flux crossing points. By means of a simple transformation each particular zero crossing curve can then be associated with a corresponding load angle. As the machine 12 passes through the operating point with a load angle associated with a zero stray flux crossing, the data analysis module 16 generates the Tables 1 to 3 as hereinbefore described.

It will be understood that the use of these zero crossing curves results in a more flexible method of determining a family of zero stray flux crossings. This method can be applied to machines 12 that have either radial or tangential probes fitted. When the machine 12 is run at a load angle associated with a zero stray flux crossing the tables of stray flux data, as hereinbefore described, in other words Tables 1 to 3 are produced.

Figure 4:
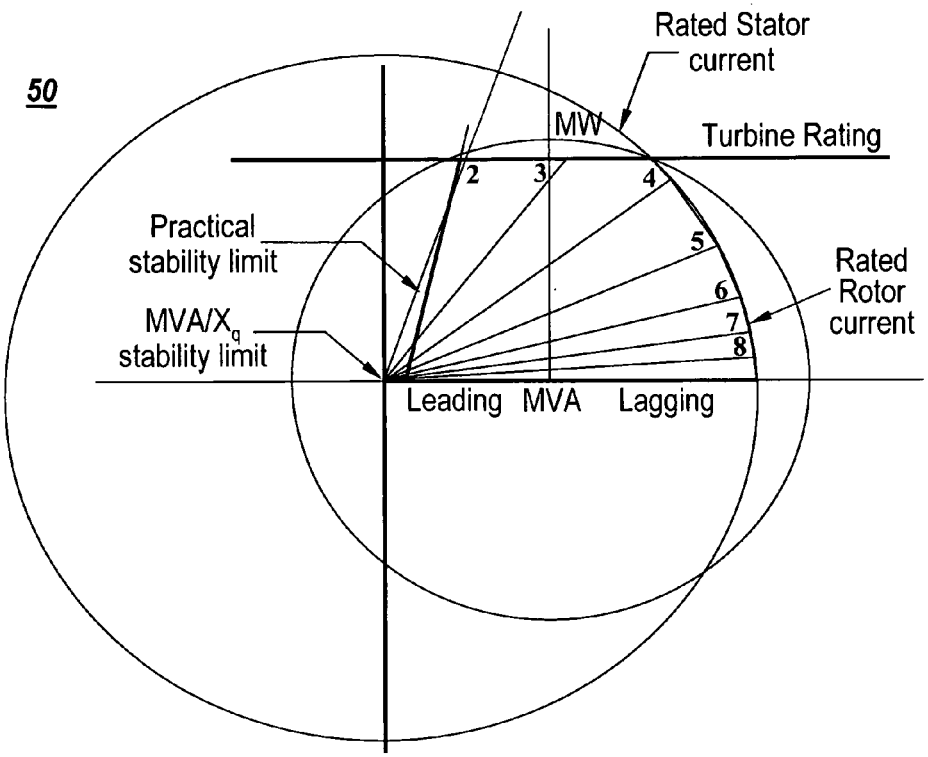
FIG. 4 shows a graphical illustration of a capability curve with zero stray flux crossings shown.

An example of a capability curve 50 with zero stray flux crossings indicated is shown in FIG. 4.

Instead, or in addition to on-line testing of the machine 12 as described, the system 10 is also used to perform one-shot testing. One-shot testing is a single test that takes a snapshot of the stray flux conditions of the machine 12 at the time of the test. The test can be performed by means of a simple instruction contained in the data capture module 14, at any machine load conditions.

Instead, or in addition to on-line and one-shot testing, the system 10 can be used for preset time testing of the machine 12. In this regard, the user interface 20 is arranged to receive information from the user to define a number of tests to be carried out within a pre-set total time period, or a number of tests to be carried out with equal time spacing. It follows that with the number of tests to be carried out within a pre-set total time period the input parameters receivable by the user interface 20 would typically be indicative of the number of tests to be carried out, the total time to carry out the tests in. The system 10 is therefore arranged to use the information received to schedule the tests at equal intervals within the total time.

It follows that for the number of tests to be carried out with equal time spacing the input parameters receivable by the user interface 20 are typically information indicative of the number of tests to be carried out and the time between each test.

Data captured by the data capture module 14 and/or data generated by the data analysis module 16 as part of the testing procedure as hereinbefore described is conveniently stored in the database 18. In particular, data may be stored for individual machines 12 tested, which data including for example machine rating plate information, number of poles, number of rotor slots, and number of turns in each individual rotor slot for each machine 12 tested.

General data for each test performed is also stored in the database 18, the general data including information indicative of the test date and time, machine load conditions, type of test in other words on-line testing, one-shot testing, or pre-set time testing for each test performed on the machine 12 by the system 10.

It will be noted that in addition, for display and storage purposes, the data analysis module 16 is arranged to calculate the number of shorted turns in a leading coil in a particular pole coil pair. This gives a simple method to determine the severity of the damage to the rotor insulation. The data analysis module 16 uses or applies the following equation to determine the number of shorted turns in a coil, for example a damaged coil:

$$NumberOfShortedTurns = \left(\left(1 - \left(\frac{Vlead1}{Vlead2}\right)\right) \times N\right)$$

where Vlead1 is the valley-to-peak value of the stray flux reading for the leading coil in the pole pair with a shorted turn; Vlead2 is the valley-to-peak value of the stray flux reading for the leading coil in the pole pair without a shorted turn and N is the total number of turns in the coil.

It follows that the system 10, in particular, the data analysis module 16 is also arranged to calculate the number of shorted turns in a lagging coil in a particular pole pair by applying the following equation:

$$NumberOfShortedTurns = \left(\left(1 - \left(\frac{Vlag1}{Vlag2}\right)\right) \times N\right)$$

where Vlag1 is the valley-to-peak value of the stray flux reading for the lagging coil in the pole pair with a shorted turn; Vlag2 is the valley-to-peak value of the stray flux reading for the lagging coil in the pole pair without a shorted turn and N is the total number of turns in each coil.

The data analysis module is also arranged to calculate the number of shorted turns using the averaged value of the leading and lagging slot peak readings by application of the following equation:

$$NumberOfShortedTurns = \left(\left(1 - \left(\frac{Vav1}{Vav2}\right)\right) \times N\right)$$

where Vav1 is the average of the absolute valley-to-peak value of the leading and lagging slot stray flux readings for the coil pair with a shorted turn; Vav2 is the average of the absolute valley-to-peak value of the leading and lagging slot stray flux readings for the coil pair without a shorted turn, and N is the total number of turns in each coil. It will be noted that this particular equation gives an indication of the number of shorted turns in a damaged coil pair.

In a preferred example embodiment, the system 10 is arranged to determine if symmetrical inter-turn faults are present in the rotor of the machine 12 from information from leading and lagging rotor slots. Also, the system 10 can automatically check if a flux probe is operating correctly and at least detecting a system recognisable signal.

Figure 2:
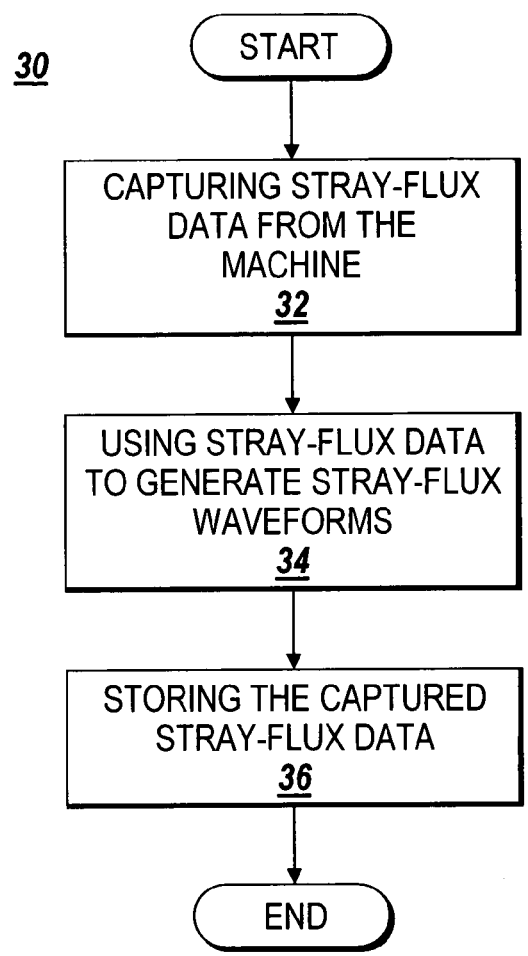
FIG. 2 shows a flow diagram of a method in accordance with an example embodiment.
Figure 3B:
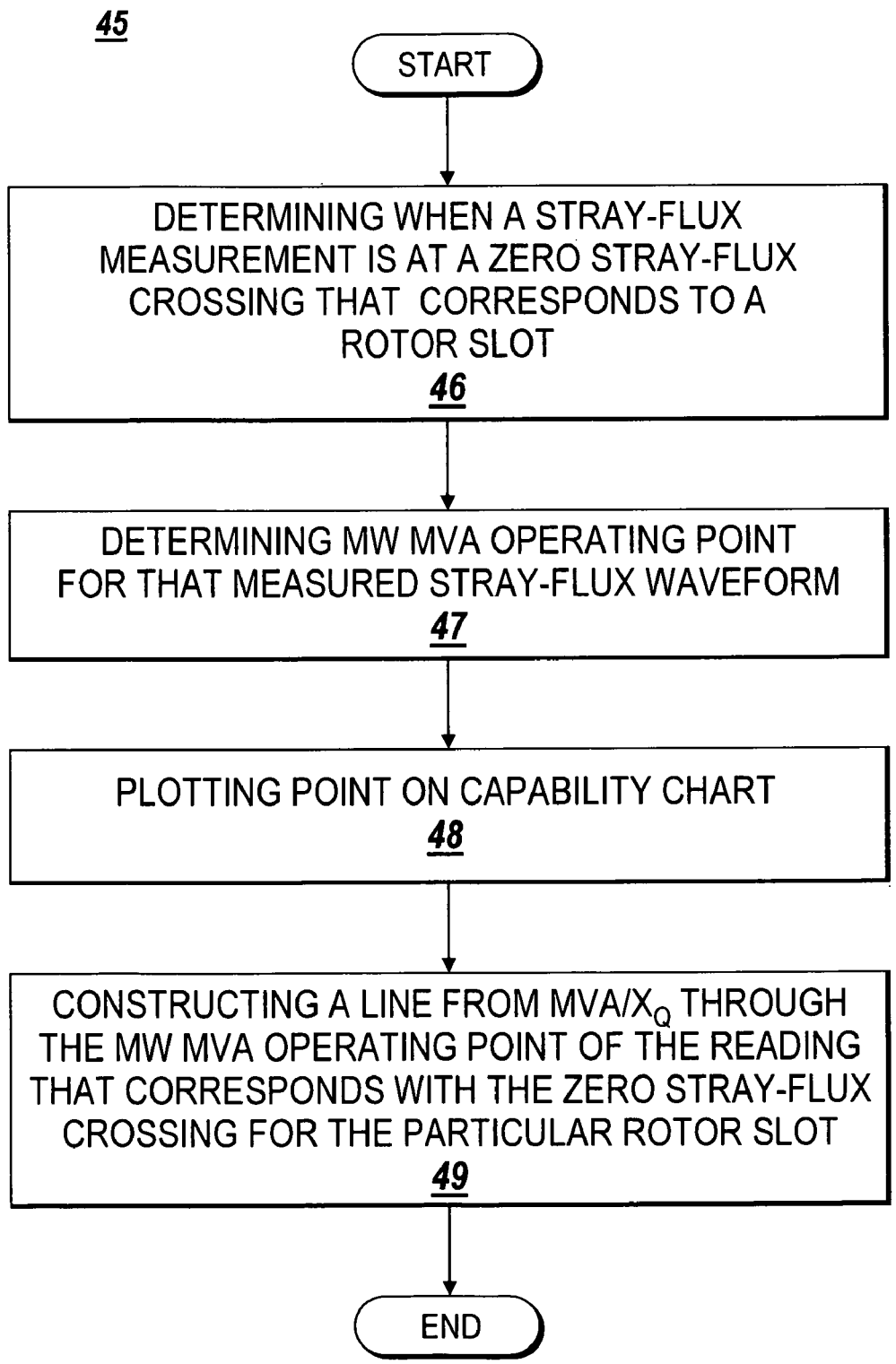
FIG. 3b shows a flow diagram of another method in accordance with an example embodiment of automatically detecting rotor lines on a capability chart.

Example embodiments will now be further described in use with reference to FIGS. 2, 3a and 3b. The example methods shown in FIGS. 2, 3a, and 3b are described with reference to FIG. 1, although it is to be appreciated that the example methods may be applicable to other systems (not illustrated) as well.

Referring to FIG. 2, a flow diagram of a method in accordance with an example embodiment is generally indicated by reference numeral 30. The method 30 is typically initiated as part of a testing procedure of the machine 12 as hereinbefore described. In other words, the method 30 is initiated as part of either on-line, one-shot, or pre-set time testing of the machine for stray flux by the system 10.

It follows that once testing is initiated, the method 30 includes capturing, at block 32, stray flux data from the machine 12. Stray flux data is captured by the data capture module 14 by way of the data radial and/or tangential flux probes. It will be appreciated that prior to the initiation of the testing, information about the machine 12 to be tested is received by the system 10 via the user interface 20, the information including inter alia the type of flux probes for example whether the probes are radial and/or tangential flux probes, the machine 12 type for example whether the machine 12 is a two or four pole machine 12, number of rotor slots, and the configuration of the number of turns in each rotor coil of the machine 12. The system 10 conveniently automatically configures itself to operate based on the information received about the machine 12. By being able to automatically configure itself for a particular machine 12, the system 10 can be used for plurality of different types of machines 12. In an example embodiment, the system 10 can also receive a synchronisation input from a shaft of a machine. This allows the detection of the signal from machine 12 to start at the identical time on each revolution of the machine 12 rotor shaft, thus allowing direct comparison of various acquired waveforms.

The method 30 further includes generating, at block 34, a stray flux waveform/s using the stray flux data captured by the data capture module 14. These waveforms will be discussed in greater detail below. As hereinbefore mentioned, the data analysis module 16 is conveniently arranged to generate the stray flux waveforms. It will be understood that from the captured stray flux data or the generated waveforms, stray flux generated by the machine 12 is conveniently detected and analysed by a user. In an example embodiment, on detection of an undesirable or pre-determined amount of stray flux from the machine 12, the system is arranged to raise an alarm signal, flag, or the like. At block 34, it will be understood that the method 30 also includes generating tables for example Tables 1 to 3 as hereinbefore described.

The method 30 includes analysing, at block 35, the stray flux waveforms and the stray flux data as hereinbefore described by way of the data analysis module 16.

The method 30 then includes storing, at block 36, at least the captured stray flux data in the database 18. It follows that the method also includes storing the generated tables in the database 18.

Although not illustrated, it will be appreciated that the method also includes visually displaying the generated stray flux waveforms to the user via the user interface 20.

Referring now to FIGS. 3a and b of the drawings, where flow diagrams of other methods in accordance with the invention are generally indicated by reference numerals 40 and 45 respectively. The methods 40 and 45 show broadly example embodiments of the analysis steps performed by the system 10, in particular the data analysis module 16 of the system 10, on stray flux data captured.

In particular, referring to FIG. 3*a*, the method 40 is for placing or plotting a stray flux reading on the capability chart. The method 40 includes determining, at block 41, zero stray flux crossing for a generated or measured stray flux waveform.

The method 40 then includes determining, at block 42, a MW MVA (Megawatt Megavolt Ampere) operating point for the generated or measured stray flux waveform.

It follows that the method 40 further includes plotting, at block 43, the point determined at block 42 on a capability chart, for example a capability chart 50 as illustrated in FIG. 4.

The method 40 is typically repeated for subsequent readings or measurements by the system 10. It will be appreciated that the method 40 determines where on the capability chart 50 the particular measurement is to be placed.

Turning now to FIG. 3*b* which shows the method 45 for automatically detecting rotor slot lines on the capability chart 50. In particular, the method 45 includes determining, at block 46, when a stray flux measurement is at a zero stray flux crossing that corresponds to a rotor slot.

The method 45 further includes determining, at block 47, a MW MVA operating point for that measured stray flux waveform in a similar fashion to the step at block 42 of FIG. 3*a*.

It follows, similar to the step at block 43 of FIG. 3*a*, that the method 45 includes plotting, at block 48, that point determined at block 47, on the capability chart 50.

The method 45 then includes, plotting, constructing or drawing, at block 49, a line on the capability chart 50 from MVA/Xq through the MW MVA operating point associated with or corresponding to the determined zero stray flux crossing for the particular rotor slot.

It will be appreciated that the method 45 is repeated in a similar fashion to method 40.

It will be further appreciated that the method 45 determines those points on the capability chart 50 which correspond to the rotor slots.

It will be understood that the stray flux waveforms as applied to the capability chart of the machine is optionally stored in the database 18.

Figure 5:
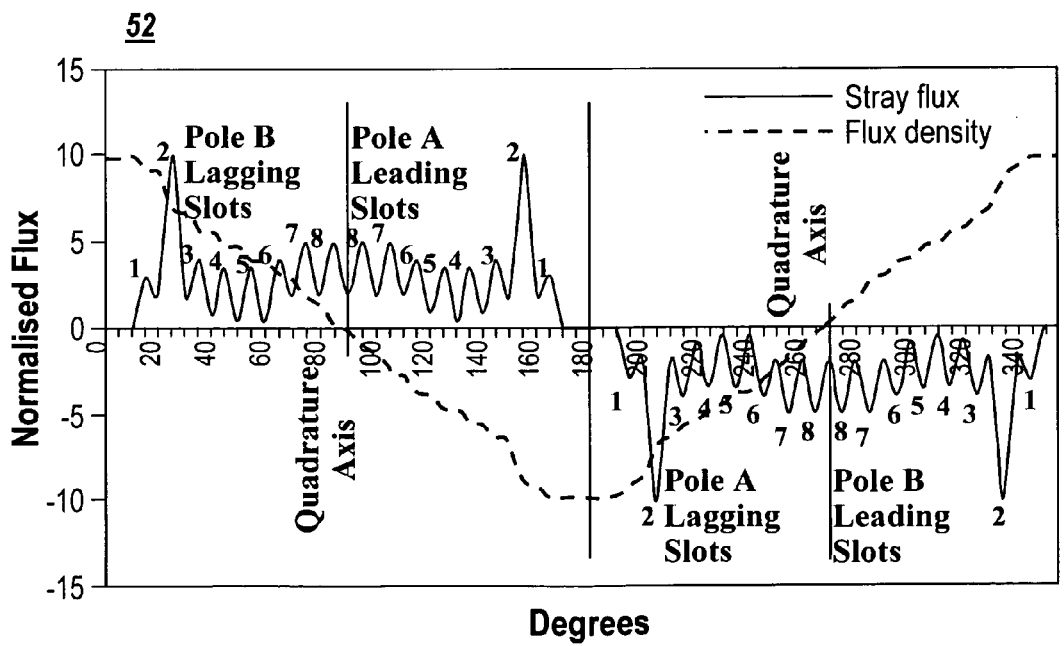
FIG. 5 shows a flux graph generated by the system of FIG. 1.

As hereinbefore discussed, the system 10 is arranged to generate a plurality of stray flux waveforms. In particular, the system 10 is arranged to generate a stray flux waveform indicating zero flux crossing as illustrated in FIG. 5 of the drawings. The waveform illustrated in FIG. 5 is in graphical form indicated by reference numeral 52 with stray flux magnitude on the vertical axis and relative phase on the horizontal axis. It will be appreciated that the airgap flux is calculated by integrating the captured stray flux signal.

Graph 52 shows the stray flux from the leading and lagging slots numbered in sequence. Graph 52 also shows the airgap flux, and its' associated zero crossings. It must be noted that graph 52 is for a two pole machine 12.

Figure 6:
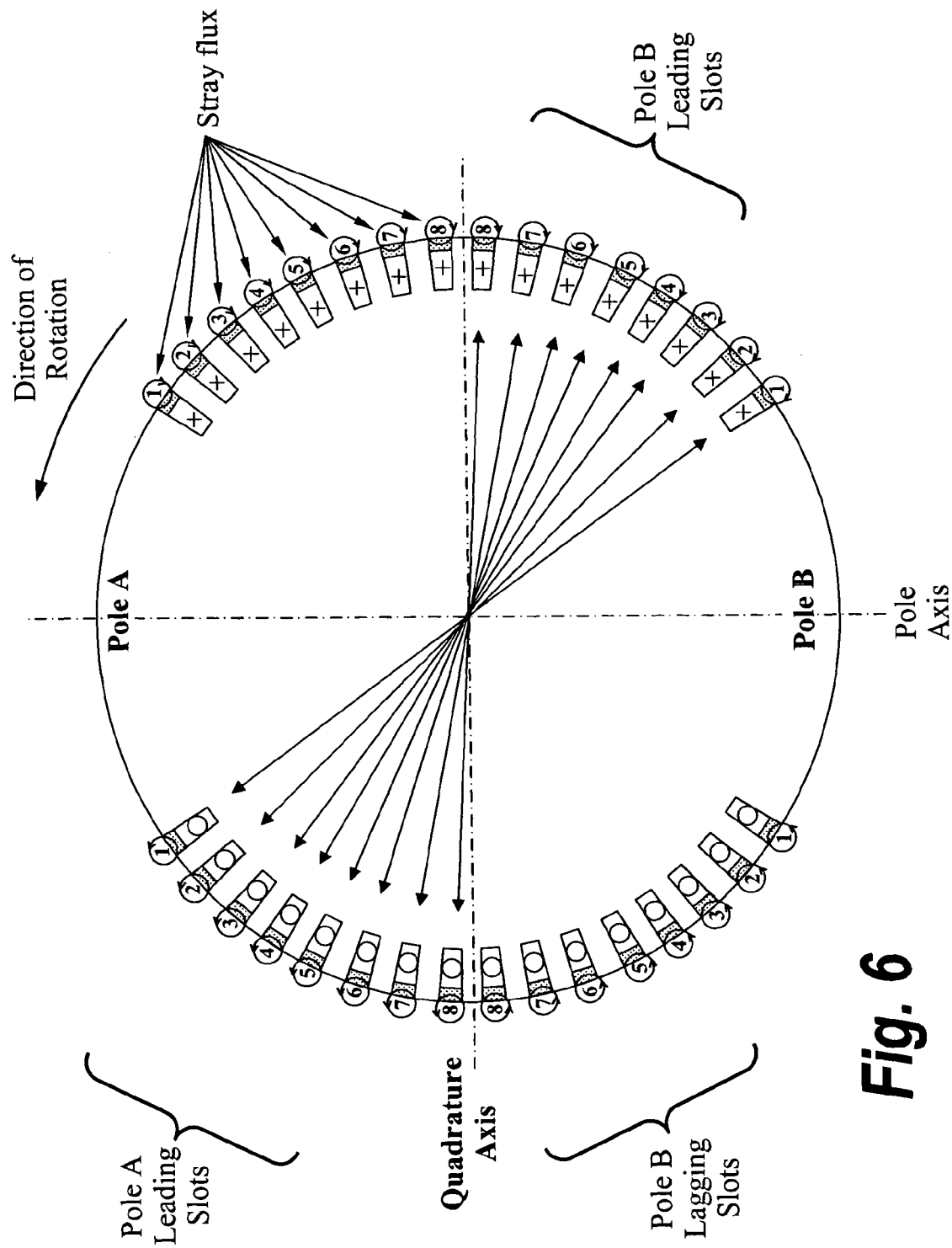
FIG. 6 shows a machine rotor cross section illustrating the comparison of corresponding coil pairs for each poles' leading pole slots
Figure 7:
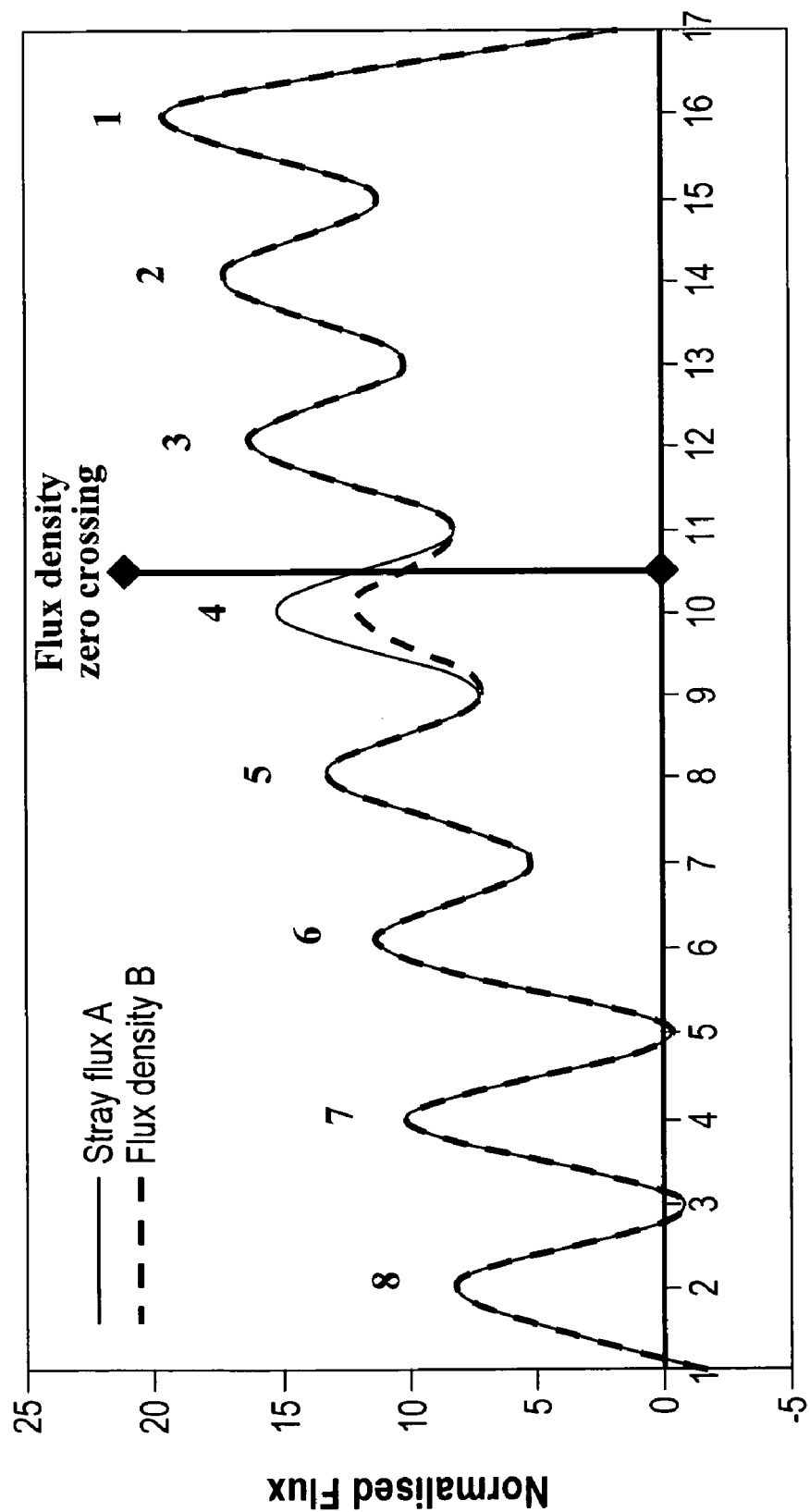
FIG. 7 shows a graph generated by the system of FIG. 1 of corresponding coil pairs for each poles' leading pole slots.

Also generated by the system 10 are graphs of comparison between poles' ((A and B) and (C and D in the case of a four pole machine 12)) stray flux captured for each slot. In this regard, we turn to FIGS. 6 and 7 of the drawings. FIG. 7 shows a graph generated by the system 10 for a two pole machine 12 with poles A and B in which the overlay of the leading slots from pole A and pole B are graphically illustrated. It will be noted that each slot is numbered. The waveform for each pole A and B is indicated in a separate colour or in a different line format for example a solid line and a broken line. The zero stray flux crossing is also indicated on the graph.

Figure 8:
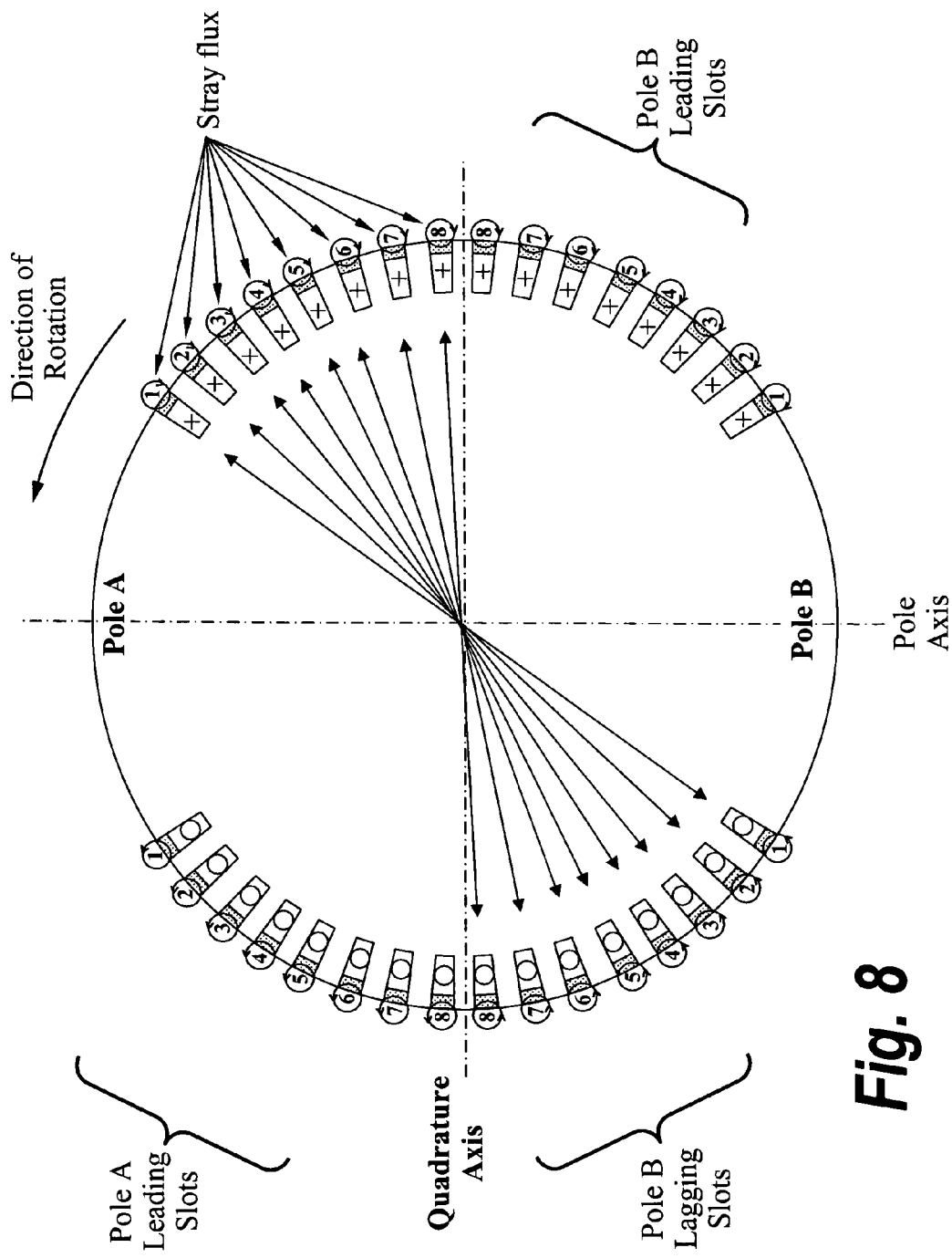
FIG. 8 shows a machine rotor cross section illustrating the comparison of corresponding coil pairs for each poles' lagging pole slots
Figure 9:
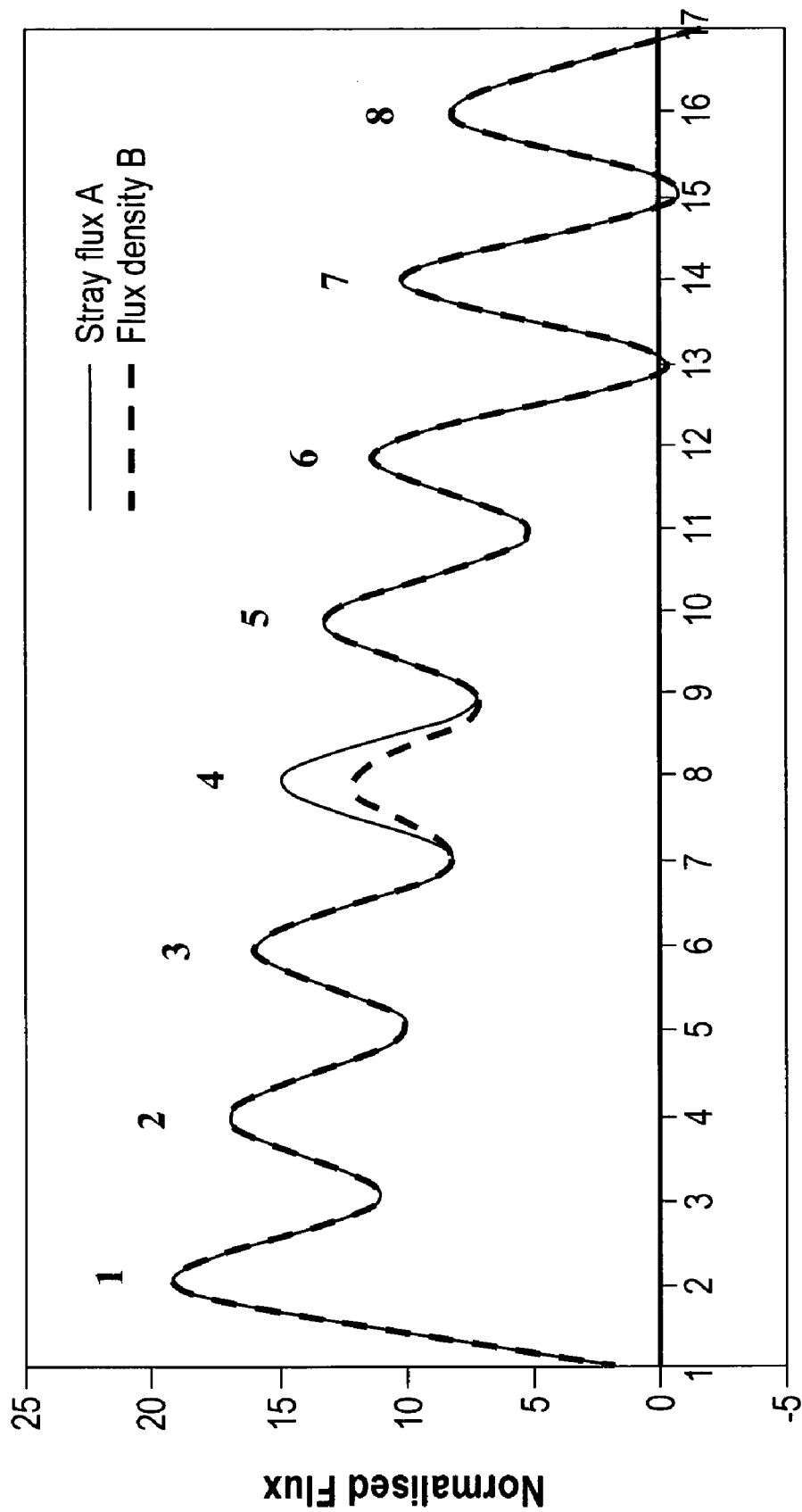
FIG. 9 shows another graph generated by the system of FIG. 1 of corresponding coil pairs for each poles' lagging pole slots.

Referring to FIGS. 8 and 9 of the drawings, a comparative graph of corresponding slots for each pole's lagging pole slots is also generated by the system 10, an example embodiment of which is shown in FIG. 9. In particular, FIG. 9 shows graphs generated by the system 10 which illustrate, graphically, an overlay of the lagging slots from pole A and pole B of a two pole machine 12. It will be understood that for a four pole machine 12, additional overlay of lagging slots from pole C and D would also be illustrated. Each slot is numbered and the waveform of each pole is indicated in a separate colour or different line format as hereinbefore described.

Figure 10:
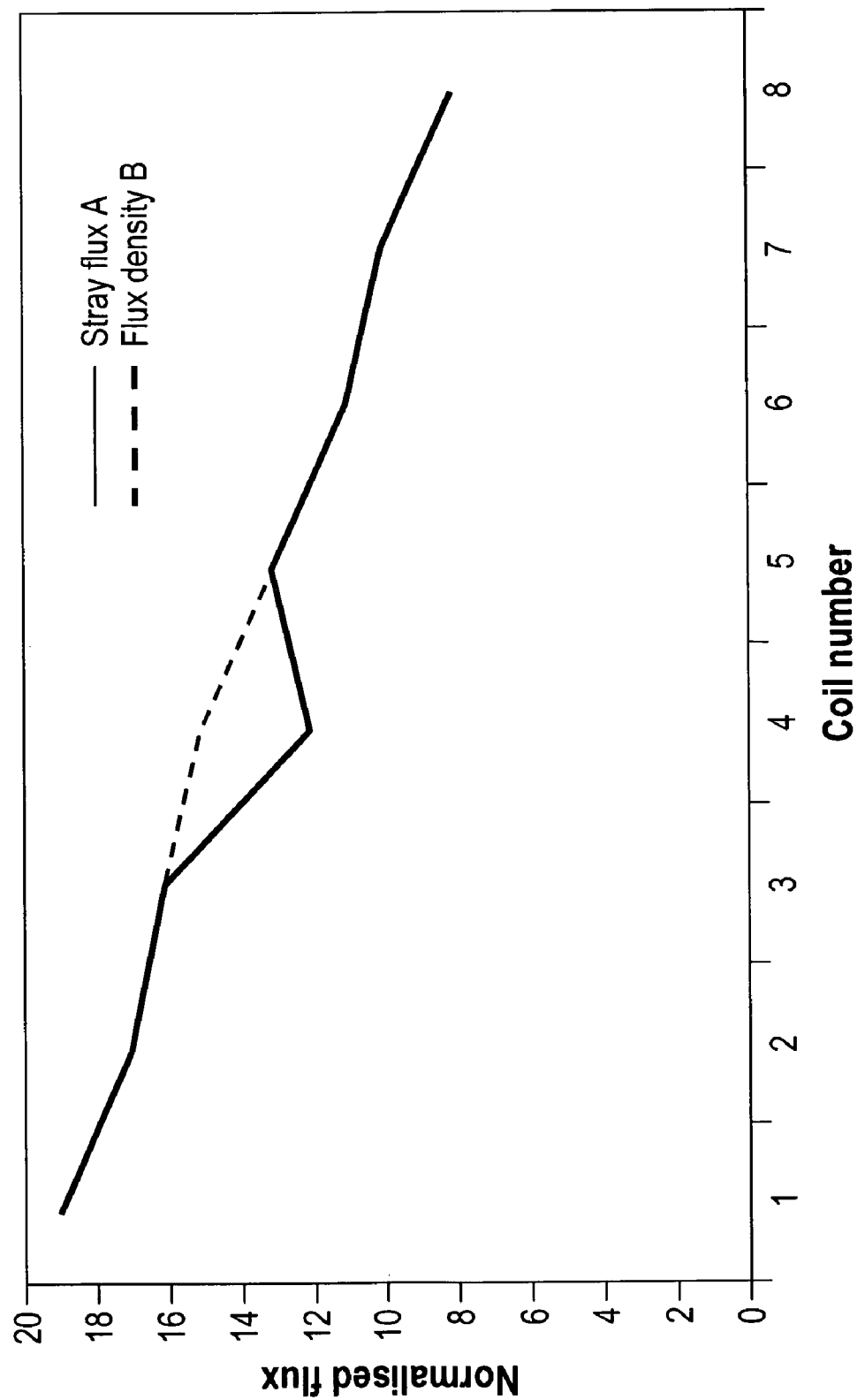
FIG. 10 shows another graph generated by the system of FIG. 1 of the valley-to-peak value corresponding coil pairs for each poles' lagging pole slots.

Referring to FIG. 10, the system 10 is also arranged to generate a comparative graph of the valley-to-peak value corresponding coil pairs for each pole's lagging pole slots an example embodiment of which graph is shown in FIG. 10. In particular, the generated graph in FIG. 10 graphically illustrates an overlay of the valley-to-peak value for the lagging slots of pole A and pole B for a two pole machine 12. The values for each pole A and B are overlaid on each other. As expected, the waveform of each pole is indicated in a separate colour or line format.

Figure 11:
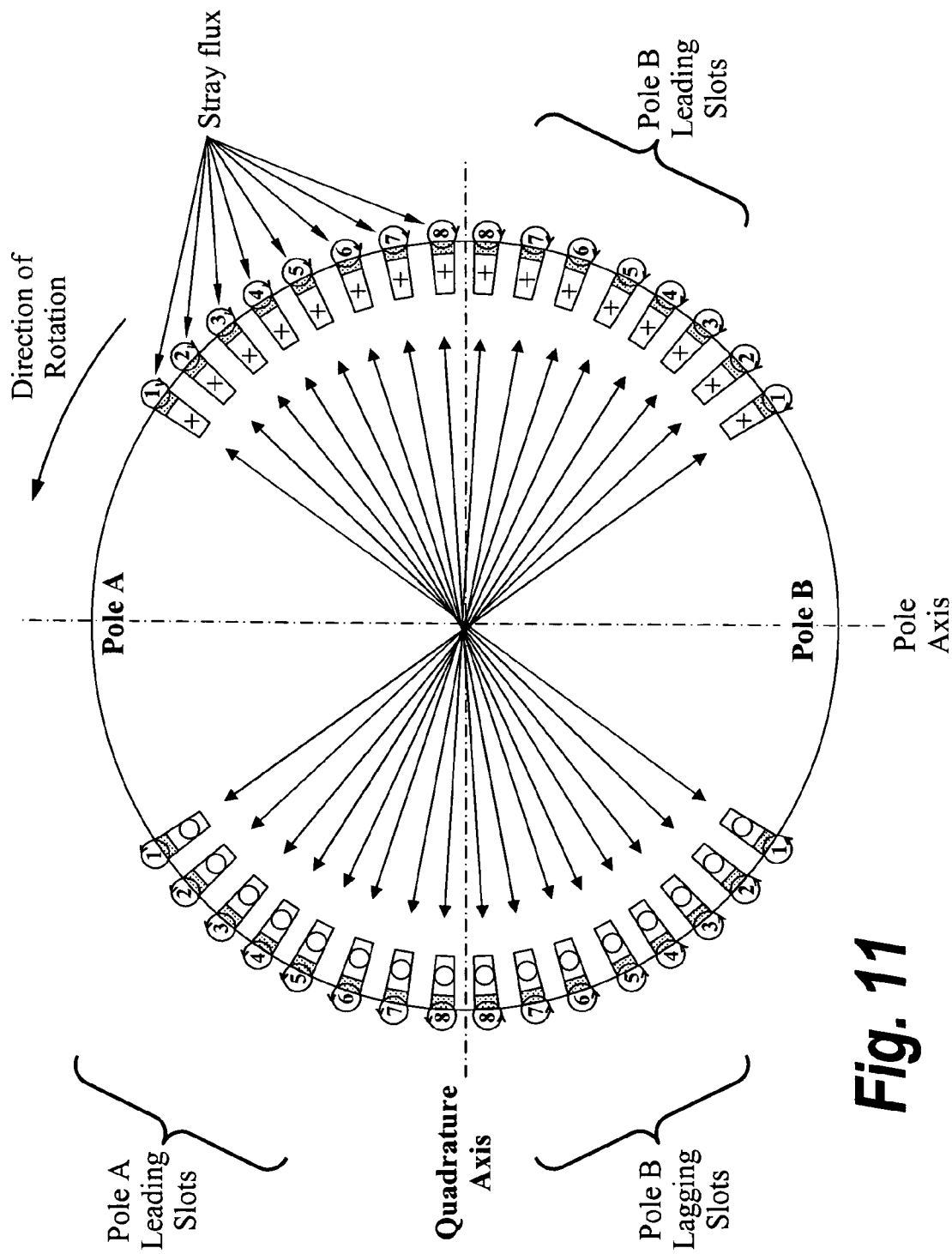
FIG. 11 shows a machine rotor cross section illustrating the comparison of corresponding coil pairs for each poles' leading and lagging pole slots.
Figure 12:
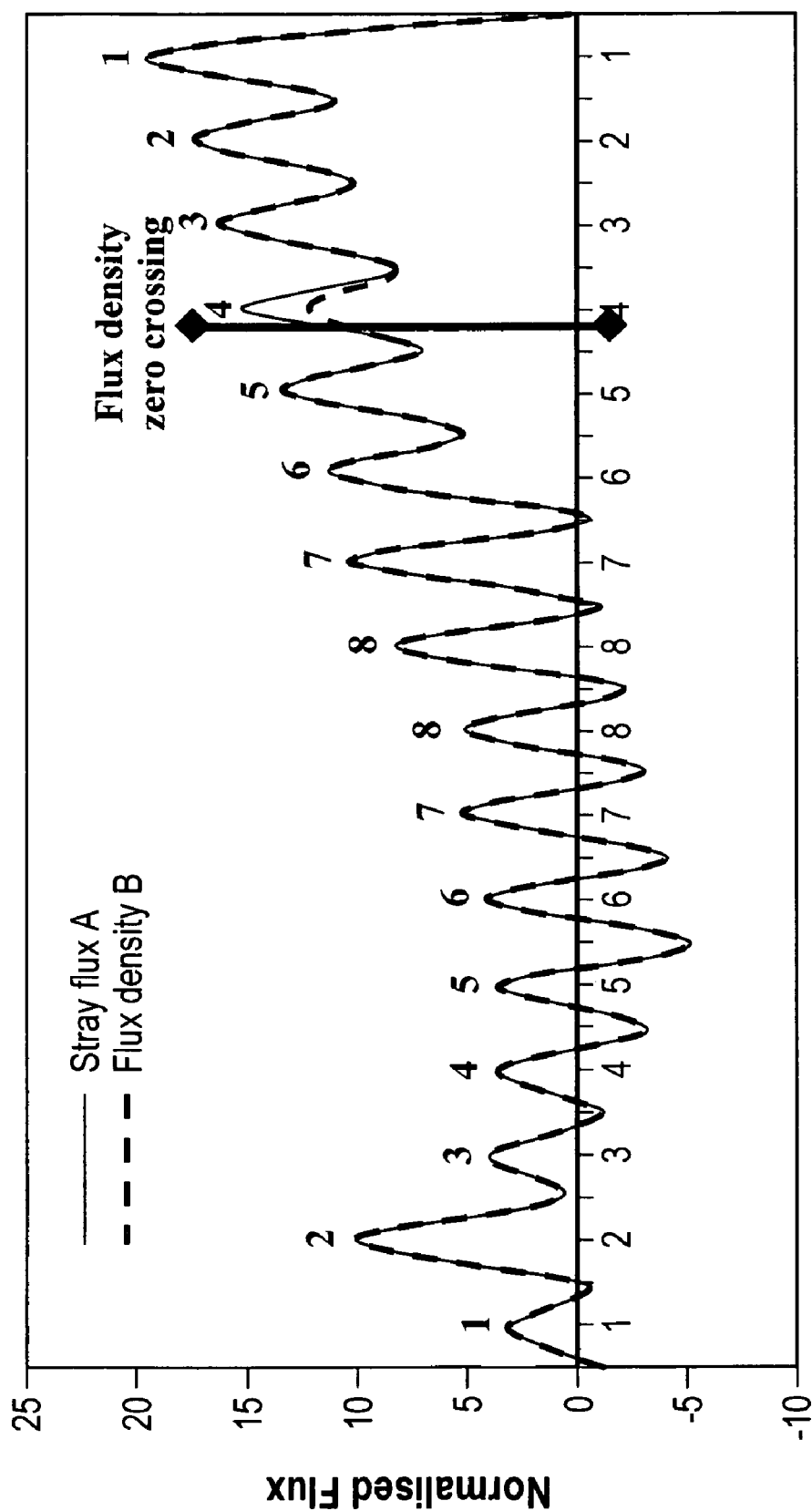
FIG. 12 shows another graph generated by the system of FIG. 1 of corresponding coil pairs for each poles' leading and lagging pole slots.

Turning now to FIGS. 11 and 12 of the drawings, the system 10 is further operable to generate a comparative graph of corresponding coil pair for each poles' leading and lagging pole slots as shown in FIG. 12. In particular, the generated graph shown is FIG. 12 graphically illustrates an overlay of the leading and lagging slots from pole A and pole B of a two pole machine 12. Each slot is numbered and the zero stray flux crossing is indicated. The waveform of each pole is also indicated in a separate colour or line format.

Figure 13:
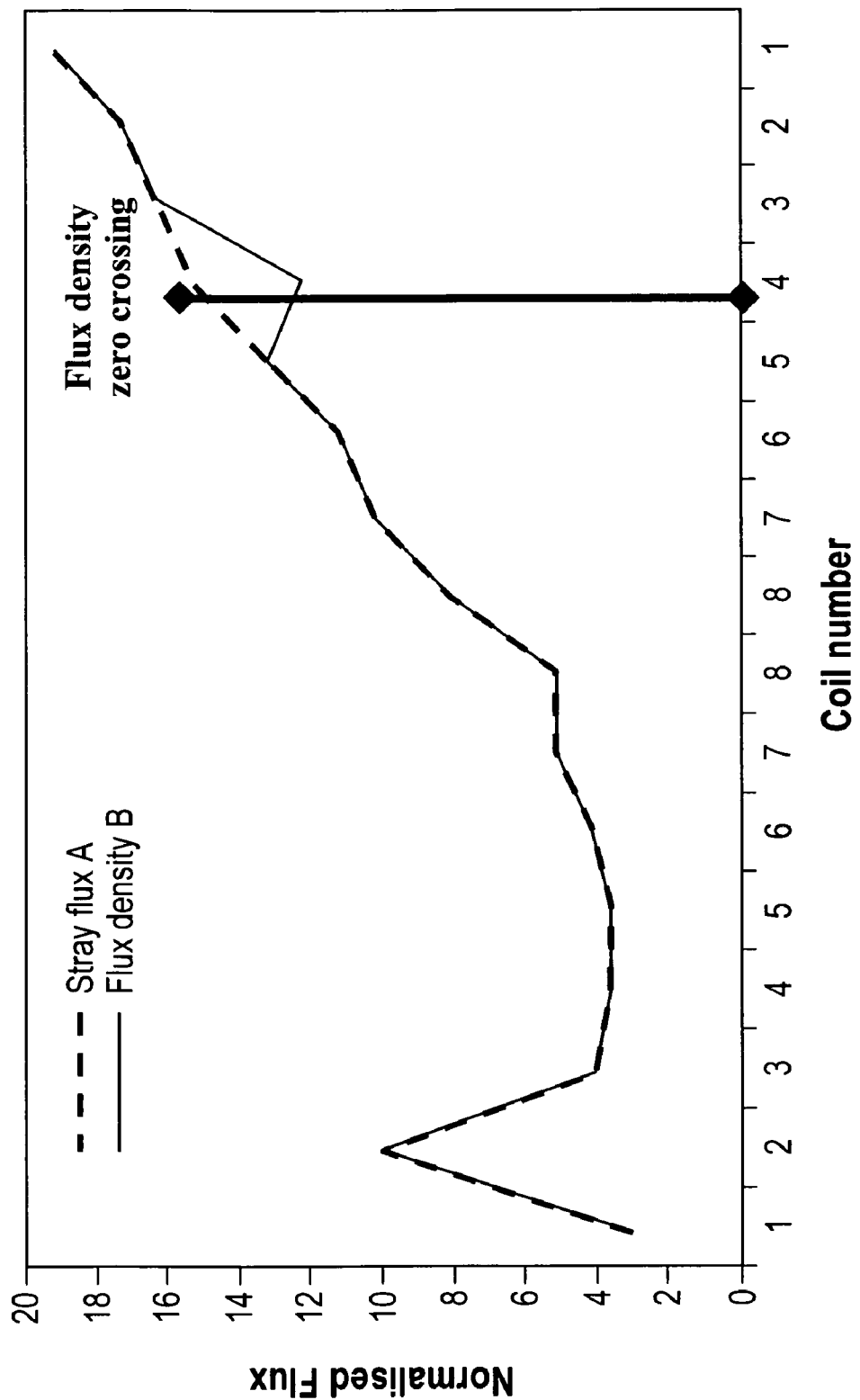
FIG. 13 shows another graph generated by the system of FIG. 1 of the valley-to-peak value corresponding coil pairs for each poles' leading and lagging pole slots.

From FIG. 13, it will be noted that the system 10 is further conveniently arranged to generate a comparative graph of the valley-to-peak value corresponding coil pairs for each poles' leading and lagging pole slots. The generated graph illustrated in FIG. 13 shows graphically the overlay of the valley-to-peak value for the leading and lagging slots of pole A and pole B for a two pole machine 12. The values for each pole are overlaid on each other. The zero stray flux crossing is indicated on the graph and the waveform for each pole is indicated in a separate colour or line format.

Figure 14:
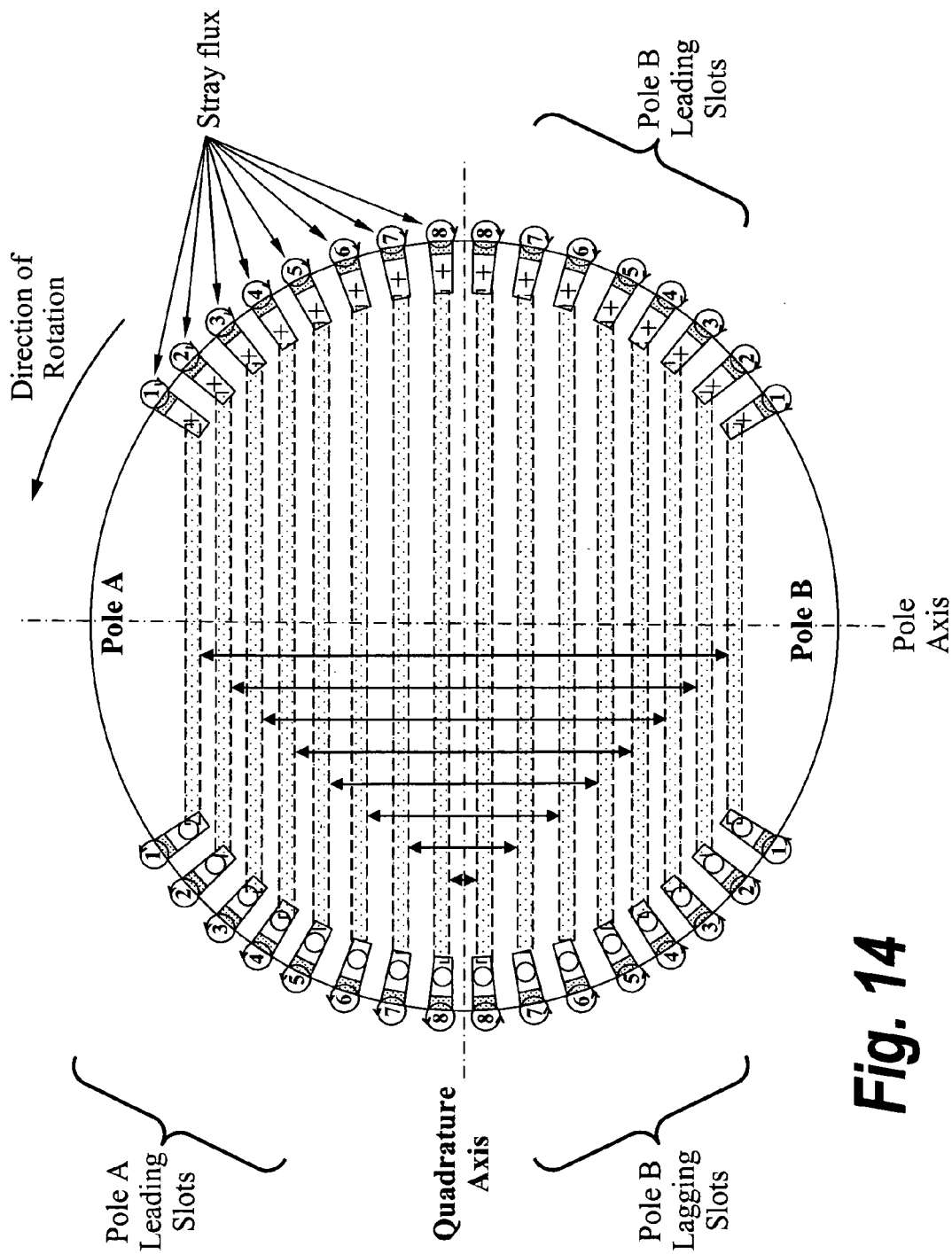
FIG. 14 shows a machine rotor cross section illustrating the comparison of the average of the absolute value of the valley-to-peak value of the leading and lagging slots for each coil pair
Figure 15:
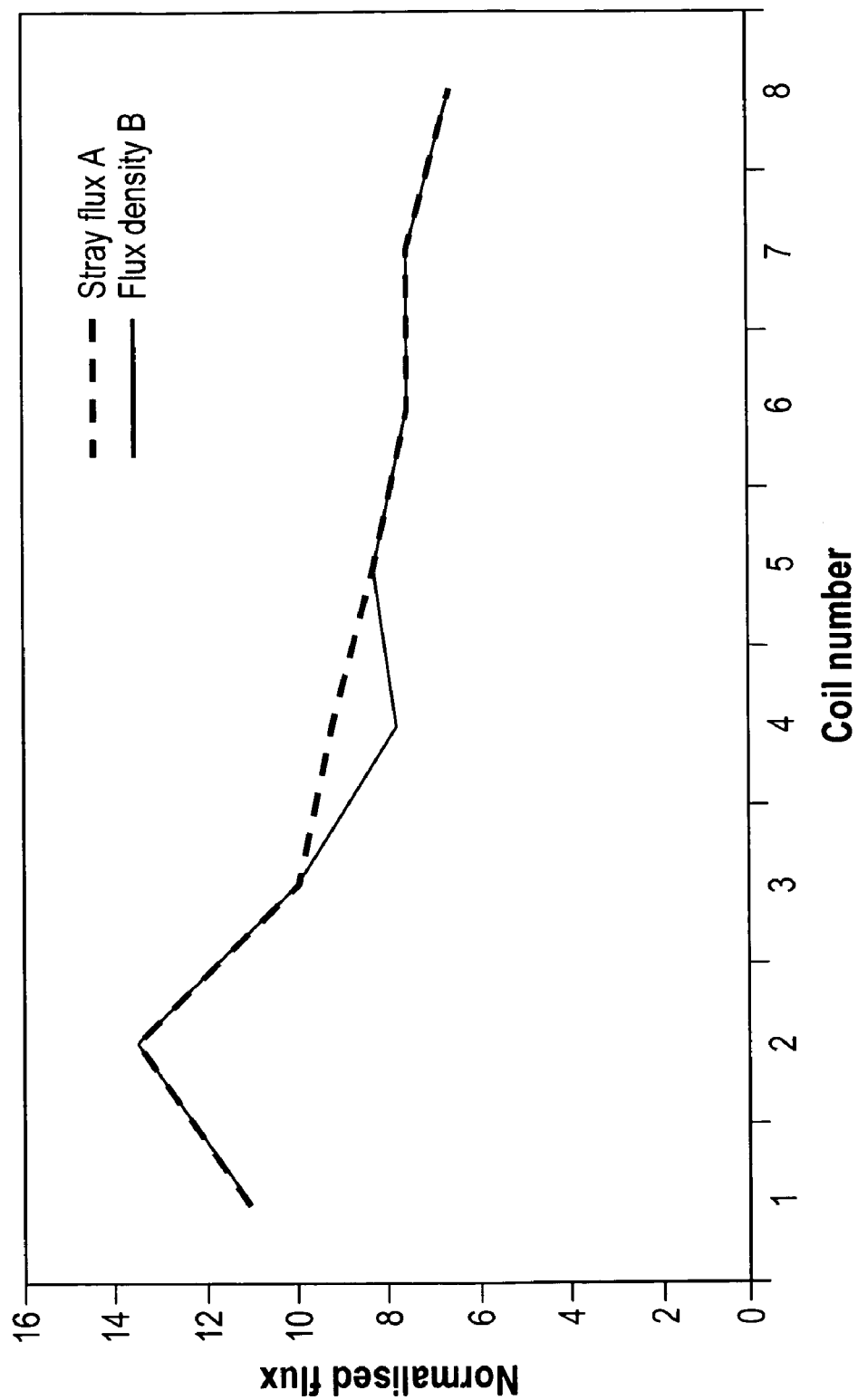
FIG. 15 shows another graph generated by the system of FIG. 1 of the average of the absolute value of the valley-to-peak value of the leading and lagging slots for each coil pair.

Referring now to FIGS. 14 and 15 of the drawings, the system 10 is arranged to generate a graph of the average of the absolute value of the valley-to-peak value of the leading and lagging slots for each coil pair as shown in FIG. 15. The generated graph shown in FIG. 15 graphically illustrates the average of the absolute value of the valley-to-peak value of the leading and lagging slots for each pole pair for a two pole machine 12. It will be noted that the waveforms are overlaid for pole A and pole B. The waveform of each pole is indicated in a separate colour or line format.

In an example embodiment, the system 10 is arranged to calculate the average of the absolute value by applying the following equation:

$$ValueM(n) = \frac{ABS(LeadingValuePoleM(n)) + ABS(LaggingValuePoleM(n))}{2},$$

where n is the slot number and M is the pole (A or B)

Figure 16:
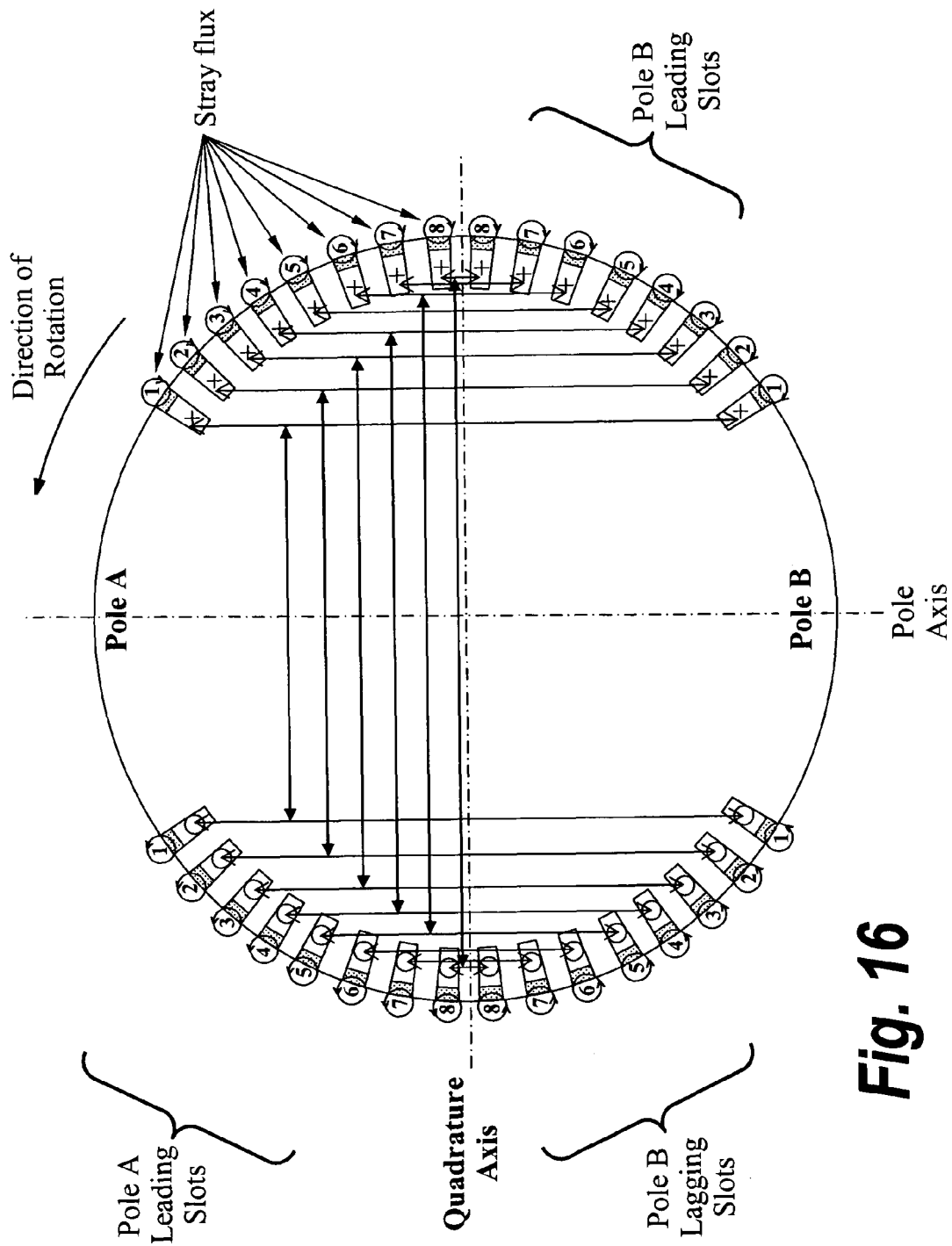
FIG. 16 shows a machine rotor cross section illustrating the comparison of the average of the absolute value of the valley-to-peak value of opposing pole coil pair leading and lagging slots.
Figure 17:
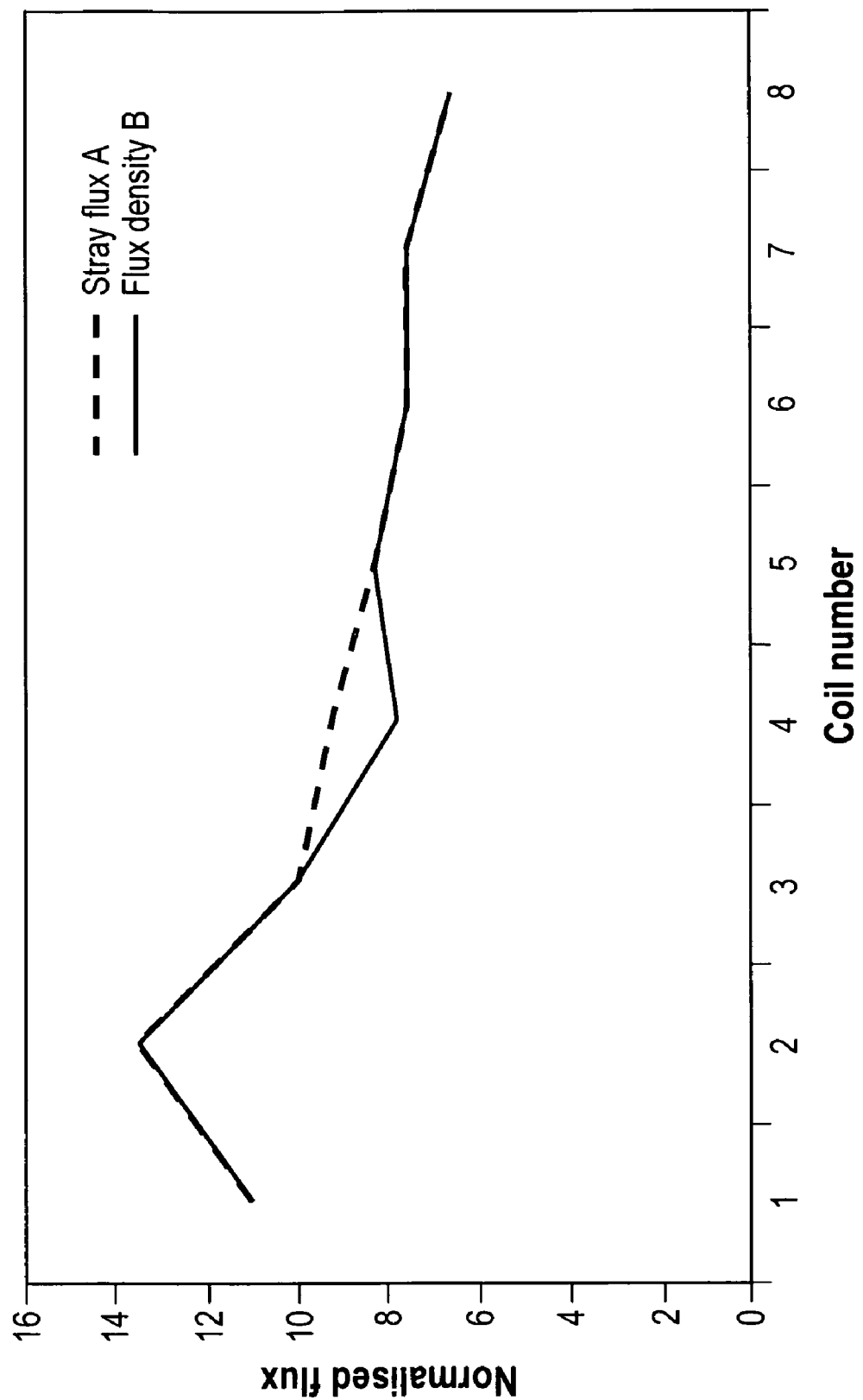
FIG. 17 shows another graph generated by the system of FIG. 1 of the average of the absolute value of the valley-to-peak value of opposing pole coil pair leading and lagging slots.

Referring to FIGS. 16 and 17 of the drawings, the system 10 is operable to generate a graph of the average of the absolute value of the valley-to-peak value of opposing pole coil pair leading and lagging slots, as illustrated in FIG. 17. In particular the generated graph as illustrated in FIG. 17 graphically illustrates the average of the absolute value of the valleyto-peak value of the opposing pole coil pair leading and lagging slots of a two pole machine 12. The graphs are conveniently overlaid for pole A and pole B. Also, the waveform of each pole is indicated in a separate colour or line format.

In an example embodiment, the system 10 is arranged to calculate the averages of the absolute values by applying the following equations:

$$ValueMP(n) = \frac{ABS(LeadingValuePoleM(n)) + ABS(LaggingValuePoleP(n))}{2}$$

$$ValuePM(n) = \frac{ABS(LeadingValuePoleP(n)) + ABS(LaggingValuePoleM(n))}{2}$$

where n is the slot number, M is the first pole (A or B), P is the opposing pole (A or B).

In an example embodiment, information used by the system 10 to generate the graphs shown in FIGS. 7, 9, 10, 12, 13, 15, and 17 is derived from data used to generate the graph illustrated in FIG. 5.

The invention as hereinbefore described allows stray flux from a machine to be analysed conveniently. The system as described above, advantageously allows a snapshot of the stray flux waveform to be captured, and multiple stray flux waveforms at predefined times and at predefined loads to be captured. The system has the stray flux data captured as part of the testing procedure stored in the database, which data is available for access at any time by a user. The availability of all the stray flux data captured allows for multiple tests to be displayed at one time. Also by using data stored from previous tests, trend characteristics of stray flux of a machine are conveniently determined. Also, by being able to receive information regarding a machine to be tested, the system as described above can automatically configure itself to operate for any machine as hereinbefore described.

The invention claimed is:

1. A method of processing stray flux data associated with a synchronous electrical machine; the method comprising:
   capturing stray flux data from the synchronous electrical machine;
   generating a stray flux waveform using at least the captured stray flux data;
   analyzing the generated stray flux waveform and the captured stray flux data; and
   storing the generated stray flux waveform and the captured stray flux data in a database,
   wherein the step of analyzing the generated stray flux waveform comprises:
      determining a capability chart associated with the synchronous electrical machine;
      determining rotor zero flux crossings from at least the stray flux waveform, the rotor zero flux crossings being those points at which flux sensitivity is at a maximum level;
      applying the rotor zero flux crossings to the capability chart; and
      plotting the rotor zero flux crossings on the capability chart.

2. The method as claimed in claim 1, the method further comprising:
   determining zero stray flux crossings for the generated stray flux waveform;
   determining a MW MVA operating point for the generated stray flux waveform; and
   plotting the determined operating point on the capability chart.

3. The method as claimed in claim 2, the method further comprising:
   determining when the captured stray flux data or the generated stray flux waveform is at a zero stray flux crossing that corresponds to a particular rotor slot;
   determining a MW MVA operating point for the generated stray flux waveform associated with the determined zero stray flux crossing that corresponds to the particular rotor slot;
   plotting the determined MW MVA operating point on the capability chart; and
   plotting a line on the capability chart from a rotor slot zero stray flux crossing line origin through the plotted determined MW MVA operating point associated with the determined zero stray flux crossing that corresponds to that particular rotor slot.

4. The method as claimed in claim 1, wherein determining the capability chart comprises:
   determining zero stray flux crossings on run up or run down of the synchronous electrical machine;
   capturing data indicative of real and reactive power of the synchronous electrical machine for each determined zero stray flux crossing; and
   generating the capability chart using at least the captured data indicative of the real and reactive powers and the determined zero stray flux crossings.

5. The method as claimed in claim 1, the method further comprising automatically generating rotor slot lines on the capability chart.

6. The method as claimed in claim 1, the method comprising determining the rotor zero stray flux crossings from machine design data and/or from the captured stray flux data.

7. The method as claimed in claim 1, the method further comprising trending any change in stray flux associated with the machine between data captures by using at least the stray flux data stored in the database.

8. The method as claimed in claim 1, the method comprising:
   capturing stray flux data automatically each time an airgap flux zero of the machine passes through a slot;
   capturing stray flux data manually as desired; and
   capturing stray flux data at predetermined intervals.

9. The method as claimed in claim 1, the method comprising:
   determining rotor slot information, the rotor slot information being indicative of leading and lagging rotor slots; and
   determining if symmetrical inter-turn faults are present in a rotor of the machine from the rotor slot information.

10. A system for processing stray flux associated with a synchronous electrical machine; the system comprising:
    a data capture module arranged to interface with the machine by way of radial and/or tangential flux probes to capture stray flux data therefrom;
    a data analysis module operable to use the stray flux data captured by the data capture module at least to:
       generate a stray flux waveform; and
       analyze the stray flux waveform and the captured stray flux data; and
    a database operable to store at least the generated stray flux waveforms and the captured stray flux data,
    wherein the data analysis module is further arranged to:
       determine a capability chart associated with the synchronous electrical machine;

determine rotor zero flux crossings from at least the stray flux waveform, the rotor zero flux crossings being those points at which flux sensitivity is at a maximum level;

apply the rotor zero flux crossings to the capability chart; and plot the rotor zero flux crossings on the capability chart.

11. The system as claimed in claim 10, the system comprising a user interface, the user interface being arranged at least to display the generated stray flux waveforms and data determined by the data analysis module.

12. The system as claimed in claim 10, wherein the data analysis module is arranged at least to generate tables, lists or similar information from the captured stray flux data.

13. The system as claimed in claim 10, wherein the data analysis module is arranged to:

determine zero stray flux crossings for the generated stray flux waveform;

determine a MW MVA operating point for the generated stray flux waveform; and plot the determined operating point on the capability chart.

14. The system as claimed in claim 10, wherein the data analysis module is arranged to detect rotor slot lines on the capability chart by:

determining when the captured stray flux data or the generated stray flux waveform is at a zero stray flux crossing that corresponds to a particular rotor slot;

determining a MW MVA operating point for the generated stray flux waveform associated with the determined zero stray flux crossing that corresponds to the particular rotor slot;

plotting the determined MW MVA operating point on the capability chart; and plotting a line on the capability chart from a rotor slot zero stray flux crossing line origin through the plotted determined MW MVA operating point associated with the determined zero stray flux crossing that corresponds to that particular rotor slot.

15. The system as claimed in claim 10, wherein the data analysis module is arranged to trend any change in stray flux associated with the machine between data captures by using at least the stray flux data stored in the database.

16. The system as claimed in claim 10, wherein the data analysis module is arranged to determine a number of shorted turns in a leading and lagging coil respectively in a particular pole coil pair associated with the machine.

17. The system as claimed in claim 10, wherein the data analysis module is arranged to:

determine rotor slot information, the rotor slot information being indicative of leading and lagging rotor slots; and determine if symmetrical inter-turn faults are present in a rotor of the machine from the rotor slot information.

* * * * *